United States Patent [19]
Bazhulin et al.

[11] 3,832,557
[45] Aug. 27, 1974

[54] INSTRUMENT FOR VIEWING AND MEASURING ELECTROMAGNETIC RADIATION

[76] Inventors: Alexei Pavlovich Bazhulin, ulitsa Vavilova, 35, kv. 30; Evgeny Alexandrovich Vinogradov, Kozhevnicheskaya ulitsa, 16, kv. 33; Natalia Alexandrovna Irisova, ulitsa Vavilova, 44, korpus 33, kv. 74, all of Moscow; Nina Vasilievna Mitrofanova, Oktyabrskaya ulitsa, 13, kv. 42, Dolgoprudny Moskovskoi Oblasti; Jury Petrovich Timofeev, Ananievsky pereulok, 5, kv. 136, Moscow; Samuil Aronovich Fridman, Profsojiznaya ulitsa, 36/9, kv. 41, Moscow; Valentina Vasilievna Schaenko, 2 Parkovaya ulitsa, 18, kv. 21, Moscow, all of U.S.S.R.

[22] Filed: May 9, 1972

[21] Appl. No.: 251,697

[52] U.S. Cl. .................. 250/461, 250/483, 250/486
[51] Int. Cl. ............................................. H01j 1/62
[58] Field of Search .......... 250/337, 459, 461, 484, 250/485, 461, 483, 486

[56] References Cited
UNITED STATES PATENTS

| | | | |
|---|---|---|---|
| 3,327,120 | 6/1967 | Weiss | 250/461 |
| 3,444,372 | 5/1969 | De Hart | 250/483 |
| 3,676,677 | 7/1972 | Condas et al. | 250/461 X |

Primary Examiner—Archie R. Borchelt
Attorney, Agent, or Firm—Holman & Stern

[57] ABSTRACT

An instrument for viewing and measuring electromagnetic radiation, wherein an image-receiving web of an image-receiving screen is formed by successively arranged layers comprising: a heat insulation backing layer, a metal layer and a luminophore layer, the image-receiving web being secured on a holder, the image-receiving screen and an excitation source are enclosed within a housing provided with windows for the passage of the electromagnetic radiation; the screen with its holder is preferably enclosed within a protective case also provided with windows for the passage of the electromagnetic radiation being measured.

9 Claims, 6 Drawing Figures

INSTRUMENT FOR VIEWING AND MEASURING ELECTROMAGNETIC RADIATION

BACKGROUND OF THE INVENTION

1. Field of the Invention

This invention relates to instruments for measuring, and, more particularly, it relates to instruments for viewing and measuring electromagnetic radiation; it can be employed both for investigation of the characteristics of various coherent and non-coherent sources of radiation in the infra-red and ultra-high frequency wavebands and as part of various practical applications of such sources.

The invention makes it possible, for instance, to determine the structure of the modes, the divergence of the beam and the radiation wavelength of infra-red lasers and UHF generators, to gauge and to model quasi-optic circuits and to practice holography, flaw detection and introscopy within the entire infra-red - ultra-high frequency region, etc.

2. Description of Prior Art

There are known laboratory-type installations for viewing directly and measuring electromagnetic radiation, based on the action of the radiation being investigated on the multilayer image-receiving webs of the image-receiving screens.

Such image-receiving webs of the known instruments comprise a heat-insulation backing layer with low heat-absorption capacity, a radiation-absorbing metal layer and a heat-sensitive layer formed either by heat-responsive phosphorus (see, for example, A. P. Bazhoulin, E. A. Vinogradov, N. A. Irisova, S. A. Friedman: "Letters to the Magazine of Theoretic and Experimental Physics," vol. 8, No. 5, p. 261, 1968) or by liquid crystals (see, for example, C. F. Augustine: "Electronics," vol. 24, p. 118, 1968).

In both cases the surface of an image-receiving web of a screen is uniformly illuminated by auxiliary sources, which in the case of employment of luminophores are sources of ultraviolet radiation (e.g., medium-pressure or high-pressure mercury lamps), and in the case of liquid crystals are sources of visible light. With the screens being heated by the electromagnetic radiation being investigated, the intensity of the luminiscence of the luminophores varies, or else, in the case of liquid crystals, the colour thereof varies, this variation corresponding to the surface density of the electromagnetic radiation to be measured. Liquid crystals involve decoding of the image presented thereby, when quantitative information is needed (by conversion of their spectral characteristics into amplitude-based characteristics), therefore, the employment of temperature-sensitive luminophores offers better possibilities, since the image presented thereby can be photographed and subjected to direct photometry. Moreover, luminophores permit measurement of a wider dynamic range of the values of the power of radiation to be investigated, since they feature greater temperature stability.

However, the known installations including luminiscent image-receiving screens are not free from serious disadvantages.

In the existing installations adapted for laboratory use the image-receiving screen is not protected from the influence of ambient heat, therefore, the clarity of the picture displayed is affected by the convection air streams. The accuracy of the response and the brightness of the image-receiving screen are influenced by the temperature of the room, this temperature more often than not differing from the one which corresponds to the maximal response of the luminophore. Besides, any mechanical action performed with the installation might easily damage the image-receiving web of the screen, whereby handling of the installation and its operation are rendered complicated.

Production of the image-receiving screens of a considerable size presents serious difficulties, which results in the limited capacity of the known installations to register radiation in the long wave region.

The hitherto existing laboratory installations do not provide facilities for adjustment of the major interrelated characteristics of the image-receiving screens thereof, such as the time constant, the response threshold, the resolution and the dynamic range of the power values that can be registered. However, such adjustment is essential to provide for the great variety of the parameters of various sources of electromagnetic radiation, as well as for the variety of the purposes of investigation.

The sources of ultra-violet excitation of the image-receiving screen, that have been hitherto used, are mounted at considerable distance from the surface of the screen, and thus the utilization of the excitation radiation is inadequately effective; moreover, these sources are of a considerable size and require a system of positive cooling thereof. Besides, they create a considerable background level of scattered ultraviolet radiation, which is harmful to the eyesight of the operator over long periods of operation and affects the quality of photography. Consequently, the hitherto known installations proved to be poorly adapted for serial quantitative measurements, particularly, when the sources of the electromagnetic radiation to be investigated vary considerably, as far as the wavelength and the density of radiation are concerned.

SUMMARY OF THE INVENTION

It is an object of the present invention to create an instrument which is compact and easy to operate, and which incorporates a luminiscent screen for viewing and measuring electromagnetic radiation, the instrument offering adjustability of the main characteristics thereof.

These and other objects are attained in an instrument for viewing and measuring electromagnetic radiation, comprising: an image-receiving screen having an image-receiving web formed by successively disposed layers; a heat insulation backing layer; a layer of metal adapted to absorb said radiation and a layer of luminophore the luminiscence of which is responsive to said electromagnetic radiation, and at least one source of excitation of said luminophore. In accordance with the present invention, said image-receiving web of said screen is secured on a holder, said at least one excitation source is disposed adjacent to said image-receiving web, said web and said source being enclosed within a housing provided with windows for the passage of said radiation being investigated.

In accordance with one modification of the invention, said housing is hermetically sealed.

Said image-receiving screen can be built up from a plurality of individual image-receiving webs, each said web being secured on its individual holder, all said holders of said plurality of webs being mounted in a single frame.

It is expedient to build up the holder from a pair of tapering rings of which one is snugly received within the other one, whereby an uniform stretching of said image-receiving web of said screen, is made possible with said web being secured in the grip intermediate of said pair of rings.

It is expedient to arrange the image-receiving screen within a case provided with windows; said case can be hermetically sealed and made to incorporate an evacuation control valve; at least one of said windows of said housing and of said case may preferably be set at an angle with respect to the path of said radiation being investigated, e.g., a Brewster angle.

It is expedient to provide the case with a heater and a temperature control device adapted to maintain the temperature of said image-receiving screen at a desired level.

It is also expedient to build up the excitation source in the form of a lamp of a toroidal shape.

In this way it has become possible to create a compact and easy-to-operate instrument for viewing and measuring electromagnetic radiation, which broadens considerably the range of the research work that can be carried out with such instruments.

BRIEF DESCRIPTION OF THE DRAWINGS

The present invention will be further described in connection with embodiments thereof, with reference being had to the accompanying drawings, wherein.

DESCRIPTION OF PREFERRED INVENTIVE EMBODIMENTS

Figure 1:
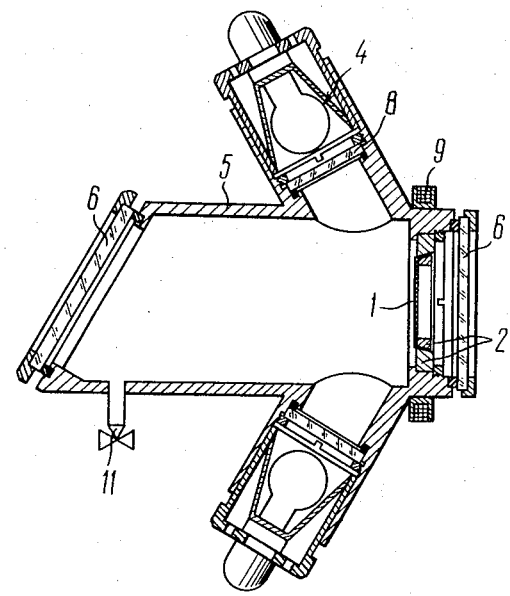
FIG. 1 is a longitudinally sectional view of an instrument for viewing and measuring electromagnetic radiation, embodying the invention.

Referring now in particular to the appended drawings, an instrument for viewing and measuring electromagnetic radiation comprises a three-layer receiving web belonging to a screen 1 (FIGS. 1 and 2), fixedly mounted in a holder 2 which may be received within a protective case 3, and at least one source of ultraviolet excitation of the image-receiving screen 1, the above components being mounted within a common housing 5 provided with windows 6. The protective case 3, if one is present, also has corresponding windows 6 which are transparent to the radiation that is to pass therethrough. The source 4 of excitation of the image-receiving screen 1 may be mounted within a reflector 7 and associated with a filter 8. The protective case 3 incorporates a heater 9 and a temperature control device 10 adapted to maintain a desired temperature of the image-receiving web of the screen 1. Furthermore, the protective case 3 may be hermetically sealed and may be associated with an evacuation control tap valve 11, in which way the heat exchange conditions may be controlled by either evacuating the case or filling it with gases having different degrees of mobility of their molecules. The image-receiving web of the screen 1 (FIG. 3) is made up by the following successive layers: a heat insulation backing 12, an absorption metal layer 13 and a layer 14 of a heat-sensitive luminophore. The heat insulation backing 12 of the image-receiving web is referrably in the form of a thin film of a synthetic material, such as a polyester film (of the "Lavsan" brand) 1 to 100 micron thick, provided that the film has low absorption of heat and sufficient strength. Nowadays such films are produced industrially at relatively low cost. The layer that absorbs the radiation being measured, i.e. the layer 13, is a thin layer of metal, e.g., of aluminium or bismuth, 5 to 200 angstrom thick, the layer being preferrably deposited onto the heat insulation backing 12 by sputtering in vacuum. The absorption factor of this layer which is thinner than the skin-layer and smaller than the length of the free path of electrons, is practically independent of the wavelength of the radiation being surveyed, if said wavelength is within a range from several microns to several decimetres, and this absorption factor can be as high as 50 percent of the power of the radiation being surveyed, intercepted by said layer, the heat absorption of this layer being negligibly small. By varying the thickness of this layer, it is possible to vary infinitely the factor of absorption of the falling energy from less than 1 to 50 percent, and thus to vary correspondingly the dynamic range of the power of the electromagnetic radiation, which is registered by the herein disclosed instrument. The heat-sensitive luminophore is preferably a luminophore capable of varying sharply the intensity of its luminiscence upon being heated from less than 1° to 200° Centigrade, the luminophore preferably being ZnCdS:Ag, Ni. The variation of the intensity of the luminiscence of such luminophores can be as high as 30 percent per degree, whereby the observer's eye can register a temperature drop as small as 0.1° to 0.2°.

Besides, in certain cases it is advisable to employ luminophores that change the colour of their luminiscence upon being heated, e.g. ZnS - Ag, Sm, wherein the colour of luminiscence varies from deep blue to red, in which way it becomes possible to obtain a multi-colour image of the fields being investigated. In the near infra-red region (from 0.9 microns to 1.5 microns) the herein disclosed instrument preferably has the screen thereof, incorporating a heat-sensitive luminophore, replaced by a screen with an optically-sensitive luminophore, e.g., ZnS-Cu, Co. In this case the metal layer acts not as an absorber but as a reflector of the varied electromagnetic radiation and of the luminiscence of the luminophore, whereby the response of the image-receiving screen and the intensity of the luminiscence thereof are increased. The last-mentioned screens are produced and employed similarly to the previously described screens, but they can be used only to deal with the near infra-red region.

Figure 2:
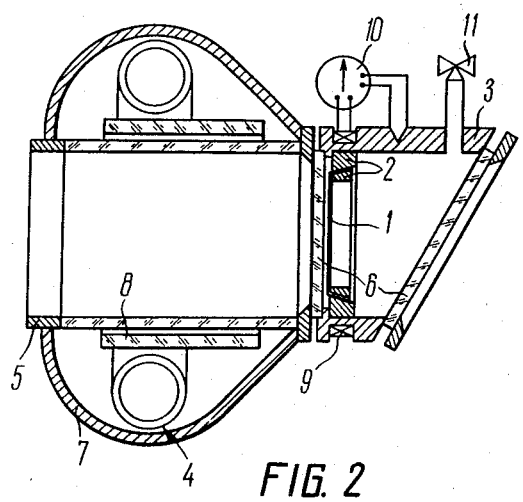
FIG. 2 shows an alternative embodiment of an instrument for viewing and measuring electromagnetic radiation, embodying the invention, in a longitudinally sectional view.
Figure 4:
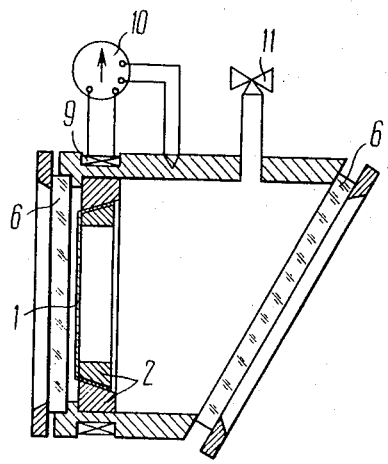
FIG. 4 illustrates a hermetically sealed protective case.
Figure 3:
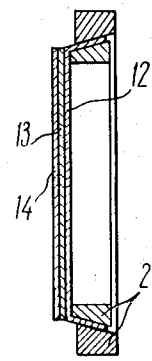
FIG. 3 shows the three-layers luminiscent image-receiving web of the image-receiving screen, secured on the holder, in accordance with the invention.

However, the great accuracy of the response to temperature brings about the necessity of stabilizing the mean temperature of the image-receiving screen 1 and of protecting it from the influence of convection air streams. This is ensured by placing the image-receiving screen 1 within a protective case 3 (FIG. 4). The protective case 3 incorporates a heater 9 and a temperature control device 10 capable of maintaining the mean temperature of the image receiving web of the screen 1 at a predetermined level, which is preferably slightly above room temperature, e.g. from 30° to 50°C. In this way it becomes possible to adjust the temperature response and the intensity of luminiscence of the luminophore, which is essential for registration of electromagnetic radiation having various surface density values. Hermetic sealing of the protective case 3 provides for varying selectively the heat transfer factor of the image-receiving screen 1 from a minimum value corresponding to heat transfer by irradiation exclusively, which is the case when the case 3 is evacuated to $10^{-2} - 10^{-3}$ mm mercury, to the maximum value corresponding to heat transfer with the help of inert gases, e.g., at a pressure about 10 atm. Thus it becomes possible to vary the time constant of the screen 1 by an order of magnitude and to influence in the same degree the range of the values of the power of the electromagnetic radiation that can be registered. Alternatively, to achieve the same goal, the image-receiving screen 1 can be mounted in a housing 5 that is hermetically sealed (FIG. 2).

To reduce the interference possibly introduced by unwanted reflections from the windows 6 of the protective case 3, which might distort the true picture of the distribution of the radiation field on the image-receiving screen 1, the windows 6 of the protective case 3 (or, alternatively, of the housing 5) are inclined with respect to the path of the radiation passing therethrough. The best results are achieved when all the windows are arranged at an angle to this path, equal to the Brewster angle, i.e., to the angle corresponding to the minimum of reflection of the radiation that is being registered. Furthermore, to reduce still further the unwanted reflection, the internal walls of the housing 5 are preferably coated with a layer adapted to absorb the radiation being registered.

The border line of the radiation being registered on the long wave side is defined by the size of the image-receiving screen, since the wavelength of the radiation being registered ought to be in any case smaller than the size of the screen 1. Therefore, it is advisable to have the image-receiving screens with a great image-receiving surface, which proves more useful for rapid and complete investigation of the field distribution even when the wavelength of the radiation being registered is substantially smaller than the size of the image-receiving screen 1. Uniformly stretched image-receiving webs of screens as large as several decimetres can be obtained by securing the web of the image-receiving screen 1 tightly on the holder 2 made up by a pair of tapering rings having but slightly different diameters (resembling a tambour). This is the preferred way to secure the web: the web of the image-receiving screen 1 is laid upon the ring having the smaller diameter, whereafter the tapering ring of the greater diameter is put thereupon, the web being straightened along the entire circumference of the ring. The taper angle of the rings should be but several degrees, e.g., 1 to 3 angular degrees. Simple as this manner of securing the image-receiving web of the screen 1 is, it, nevertheless, yields firm, uniformly taut web.

Figure 5:
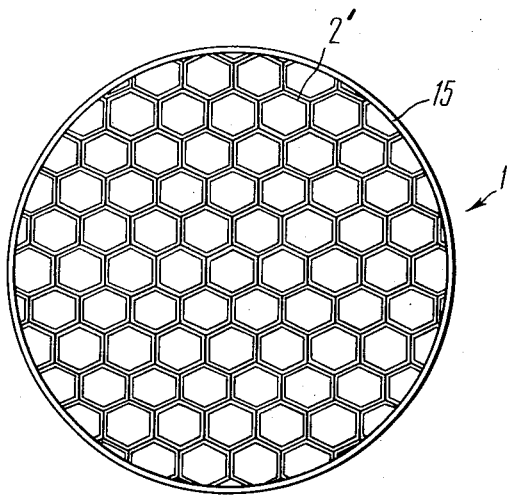
FIG. 5 schematically illustrates the general view of the image-receiving screen of a considerable size, built up from a plurality of individual image-receiving webs, in accordance with one of the features of the invention.

Should the image-receiving screen 1 be even greater, e.g., one metre in diameter, it is preferably made up from several smaller image-receiving webs tightened on their individual holders 2' secured within a common frame 15 (FIG. 5). Image-receiving screens of this size offer registration even of radio waves within a decimetre waveband. It should be noted that the maximal size of the image-receiving screen 1 is practically limited only by the capacity of the ultra-violet excitation sources that are employed.

The sources 4 for excitation of the luminophore can be in the form of compact low-pressure mercury lamps having the walls of their vessels coated with a luminophore converting shortwave ultra-violet radiation, e.g., with λ equal to 254 nm. into somewhat longer waves, e.g., λ equal to 360–380 nm. This ultra-violet radiation with a somewhat longer wavelength is in better accordance with the excitation spectra of the heat-sensitive luminophores and renders the herein disclosed instrument more effective. Besides, that last-mentioned radiation is less harmful to the eyesight of an operator. The lamps are mounted in reflectors 7 and are associated with filters 8 arresting visible luminiscence and passing ultraviolet radiation through. The low-pressure lamps require substantially less electric power, can do without a cooling system and light up swifter than the commonly employed medium-pressure and high-pressure mercury lamps, and, this feature facilitates operation and simplifies the structure of the apparatus. However, these lamps (FIG. 1) yield smaller power of the ultraviolet radiation. Therefore, they are to be positioned closer to the surface of the image-receiving screen 1, and this, in its turn, gives poorer uniformity of excitation. Consequently, to ensure uniform luminiscence of the image-receiving screen 1, several such lamps are needed, e.g., three or even four lamps. With this number of lamps the uniformity of excitation is about 10 percent with the spacing between the lamps and the surface of the image-receiving screen as great as two diameters of the vessel of the lamp, which uniformity is quite sufficient. However, the best results are achieved with a source 4 of a toroidal shape, mounted concentrically with the image-receiving screen 1 (FIG. 2).

Figure 6:
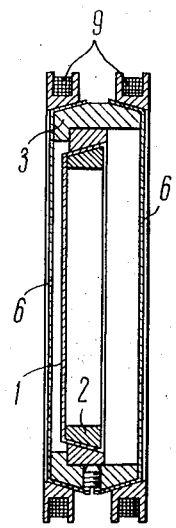
FIG. 6 illustrates a separable protective case in accordance with the invention, used when the instrument is operated with external ultraviolet excitation sources.

In several specific cases, e.g., in case of holography, when the herein disclosed instrument is used for viewing the interference pictures of the distribution of the radiation field, e.g., in the far infrared region, it is advisable to employ a separate protective case 3 and an ultraviolet excitation source 4, e.g., a medium-pressure mercury lamp. In such cases a case 3 (FIG. 6) which is not sealed hermetically might be of interest. The windows 6 of this case are made from a thin film of a synthetic material, e.g., of a polyester film several micron thick, and they are secured in the manner described hereinabove in connection with the web of the image-receiving screeen 1. The compact size of the protective case 3 of the last-mentioned structure offers better utilization of the abilities of interference structures in the far infra-red and ultra-high frequency regions.

The structure of the herein disclosed apparatus makes it possible to replace one type of the image-receiving screen 1 swiftly with a screen of a different type. In this way it becomes possible to use in operation a whole set of such replaceable screens having different characteristics.

The herein disclosed instrument for viewing and measuring electromagnetic radiation is operated, as follows.

When the sources 4 (FIGS. 1 and 2) of ultraviolet radiation are connected to mains supply, there appears after a lapse of several seconds on the screen 1 visible uniform luminiscence, e.g., in the yellow-green region, the intensity of this luminiscence being sufficient both for viewing and photography. Then the instrument is tuned to create optimal conditions for utilization of its parameters (meaning the time constant, the resolution, the dynamic range and the response), the tuning being performed by adjusting the intensity of the ultra-violet radiation, e.g. by varying the current flowing through the ultraviolet lamps, the temperature preset by the temperature control 10 and the heat transfer conditions (by either evacuating the protective case 3 or by filling it with an inert gas). Then the instrument is placed within the field of the radiation to be investigated, the action of this radiation upon the luminiscent image-receiving screen 1 leading to local heating of the areas of this screen. This results in variation of the intensity of the luminiscence in these areas, corresponding to the surface density of the elctromagnetic radiation being measured. Thus, there appears across the image-receiving screen 1 an image of the radiation field, which can be either surveyed by viewing or photographed.

Measurement of the distribution of the electromagnetic radiation field that is being investigated can also be performed, provided there is a gauging source of this radiation having known, e.g., uniform, distribution of the radiation density. In this case photometry is performed, and then the photo images (the films) of the radiation being investigated and of the standard radiation from the gauging source are compared.

The herein disclosed instrument for viewing and measuring electromagnetic radiation can be widely employed for imitating and modelling the electromagnetic fields of large-scale reflecting, scattering and transmitting systems in the ultrahigh frequency region; for tuning and gauging corresponding sources in the ultra-high frequency - infra-red regions; for investigating the structure of the modes, the divergence of the beam, the radiation wavelength of infra-red lasers and ultra-high frequency generators; for monitoring the mode pattern and for registration of interferograms. The herein disclosed instrument opens broad horizons for various important practical applications of coherent sources of infra-red and ultra-high frequency radiation (such as flaw detection, introscopy, holography, communication and object location systems, etc.).

What we claim is:

1. An apparatus for viewing and measuring electromagnetic radiation, comprising: a housing, and image-receiving screen mounted in said housing, said screen including an image-receiving web including at least three successive layers, the first of said layers being a heat insulation backing, another one of said layers being a metal layer adapted to absorb said radiation and having a thickness of 5 to 200A., and the third of said layers being a layer of luminophore the luminescence of which is responsive to said radiation; holder means having said image-receiving web of said screen secured thereto; at least one source of excitation of said luminophore, also mounted in said housing adjacent to said screen.

2. An apparatus according to claim 1, wherein said housing is hermetically sealed.

3. An apparatus according to claim 1, wherein said image-receiving screen is built up from a plurality of said image-receiving webs having individual holder means, each said web being secured on its individual holder means, all said holders of said plurality of webs being mounted in a single frame.

4. An apparatus according to claim 1, wherein said holder means includes two concentric rings, whose adjoining surfaces are tapered at an identical angle of several degrees and one of which is received within the other, whereby an uniform stretching of said image-receiving web of said screen is made possible, said web being secured intermediate of said pair of rings.

5. An apparatus according to claim 1, further comprising a casing having windows, said screen being disposed within said casing.

6. An instrument according to claim 5, wherein said casing hermetically sealed and incorporates an evacuation control valve, said casing being filled through said valve with various gases under pressures ranging from $10^{-3}$ mm Hg to 10 atm.

7. An apparatus according to the claim 5, wherein at least one of said windows is set at an angle with respect to the path of said radiation, e.g., at a Brewster angle.

8. An apparatus according to claim 5, wherein said casing incorporates a heater means and a temperature control device adapted to maintain the temperature of said screen at a desired level.

9. An apparatus according to claim 1, wherein said source of excitation includes a lamp of a toroidal shape.

* * * * *